United States Patent [19]

Odashima et al.

[11] Patent Number: 5,243,475
[45] Date of Patent: Sep. 7, 1993

[54] APPARATUS FOR CONTROLLING OPEN/CLOSE DRIVE OF A LID FOR A RECORDING MEDIUM PLAYER

[75] Inventors: Masahiro Odashima; Yoichi Yamazaki, both of Kawagoe, Japan

[73] Assignee: Pioneer Electronic Corporation, Tokyo, Japan

[21] Appl. No.: 657,797

[22] Filed: Feb. 20, 1991

[30] Foreign Application Priority Data

May 21, 1990 [JP] Japan .................................. 2-130994
May 21, 1990 [JP] Japan .................................. 2-130995

[51] Int. Cl.$^5$ ............................................. G11B 33/00
[52] U.S. Cl. ........................................ 360/71; 360/69; 360/99.03; 360/99.07
[58] Field of Search ............. 360/69, 71, 99.03, 99.07; 369/77.1, 77.2

[56] References Cited

U.S. PATENT DOCUMENTS 4,851,938 7/1989 Inami ..................... 360/69
5,097,378 3/1992 Nakabayashi ............ 360/71 X
5,105,317 4/1992 Sugiyama et al. ............ 360/71

OTHER PUBLICATIONS

Patent Abstracts of Japan, vol. 13, No. 363 (P-918)(3711) Aug. 14, 1989.
Patent Abstracts of Japan, vol. 7, No. 270 (P-240)(1415) Dec. 2, 1983.

*Primary Examiner*—David L. Robertson
*Attorney, Agent, or Firm*—Sughrue, Mion, Zinn, Macpeak & Seas

[57] ABSTRACT

A driving apparatus for opening and closing a lid which is provided to open or close a recording medium insertion opening of a recording medium player. When the lid does not reach a fully opened position or a fully closed position in a predetermined period of time after the starting of opening or closing drive of the lid, such a fault condition can be removed by inverting the direction of rotation of a driving motor. Moreover, the lid is driven in the closing direction after a predetermined period of time from the time when a recording medium is inserted into the recording medium insertion opening, or the lid is driven in the closing direction in response to a closing command. By these operations, it is made possible to prevent the lid from being left in a halfway closed position.

10 Claims, 4 Drawing Sheets

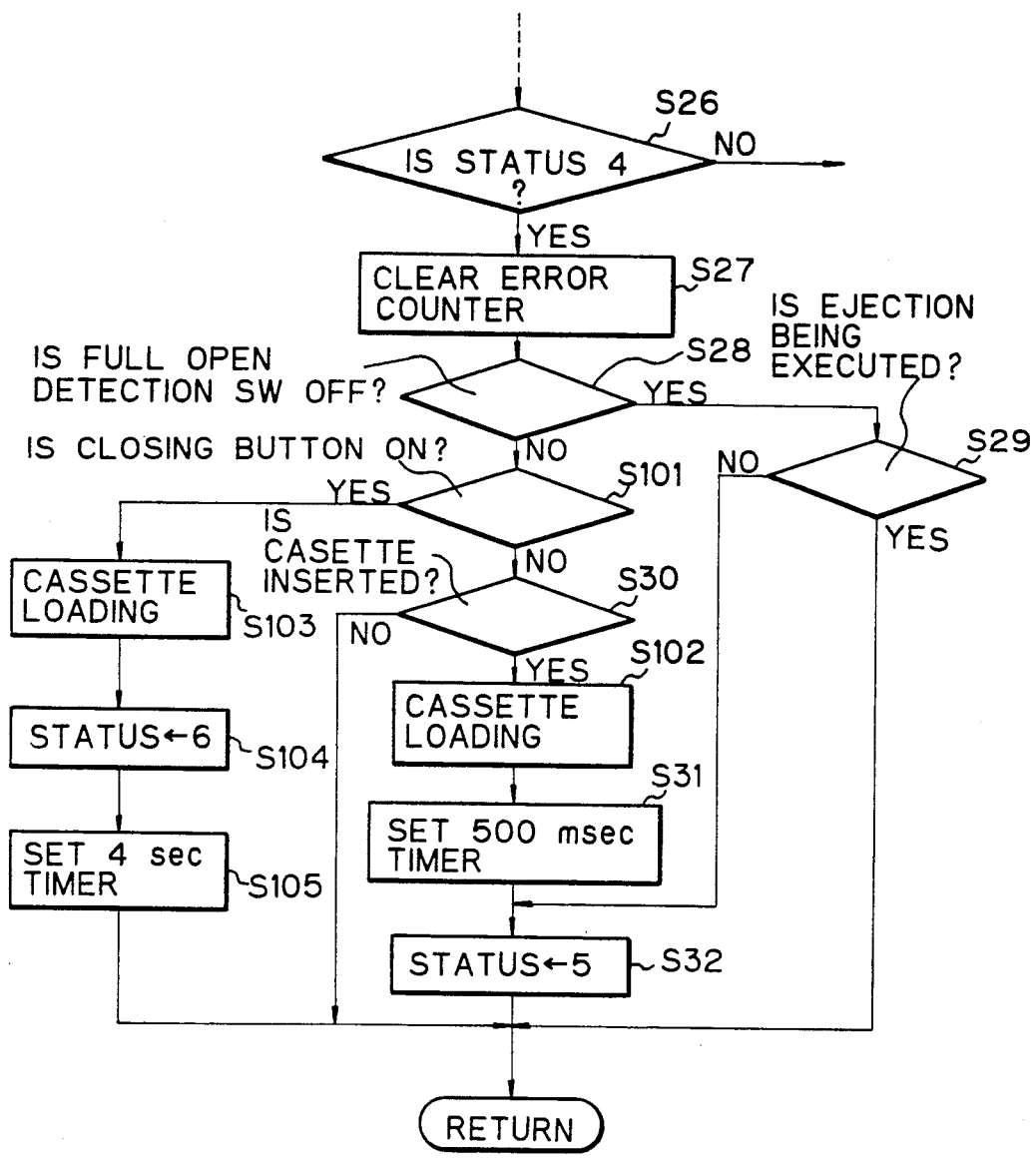

APPARATUS FOR CONTROLLING OPEN/CLOSE DRIVE OF A LID FOR A RECORDING MEDIUM PLAYER

BACKGROUND OF THE INVENTION

1. Field of the Invention

The present invention relates to an apparatus for controlling the opening and closing of a lid, and more particularly to an open/close drive apparatus for driving a lid of a recording medium playing apparatus, which is arranged to open and close for the opening and closing of a recorded medium insertion opening provided on the front panel of a main body of the recording medium playing apparatus, and on which control buttons are arranged.

2. Description of the Background Information

In the case of a recording medium playing apparatus, a cassette deck for example, especially in the case of a cassette deck mounted in a vehicle, it generally has a construction that a cassette tape is inserted and ejected in and from the cassette deck through a cassette insertion opening provided on the front panel of a main body of the cassette deck. The cassette insertion opening is provided with a lid in order to prevent dust from coming into the inside of the deck through the insertion opening. By using a large lid, for example, a lid covering the whole front area of the main body of the deck, and providing control buttons on the lid so that it also serves as a control panel, a limited space in the front area of the main body can effectively be utilized since the control buttons are arranged in the area covering the cassette insertion opening with such an arrangement. Furthermore, there is a cassette deck in which a motor is used as a source of driving force and the lid is driven to automatically open and close by the motor.

In the case of a cassette deck which is so constructed that the lid is used also as a control panel and is automatically opened and closed, there is a possibility of a problem that the lid cannot reach a fully opened or closed position when hindered by an obstacle to the opening or closing operation. Therefore, a measure to solve such a problem is desired.

In cassette decks, there are two kinds of loading mechanisms for loading a cassette tape inserted through a cassette insertion opening into a playing position. One is a mechanical loading mechanism in which the cassette tape is loaded into the playing position by utilizing the pushing effort of a user as a driving power source, and the other is a so called power loading mechanism in which the cassette tape is automatically loaded in the playing position in response to a loading command utilizing a plunger etc. as a driving power source.

Now, the timing of a closing drive of a lid of an automatic opening and closing type in a cassette deck will be discussed. Conventionally, in the case of a cassette deck with a mechanical loading mechanism, driving of the lid in a closing direction is started simultaneously with the loading of a tape. In the case of a cassette deck with a power loading mechanism, on the other hand, the drive of the lid in the closing direction is started at a time point of completion of the loading.

As described above, in the case of a cassette deck with a mechanical loading mechanism, if the closing operation of the lid is started immediately after the cassette tape is inserted, a finger of the user may touch the lid thereby pinching the finger against the main body of the player. In particular, in the case of a loading mechanism in which it is necessary to push the cassette tape deeply into the apparatus, the pinching of the finger may become significant.

On the other hand, in the case of a cassette deck with a power loading mechanism, if a closing operation is started after the completion of the loading, there will be a disadvantage that a long time is required for completing the operation to move the lid to a fully closed position after the generation of a loading command.

OBJECT AND SUMMARY OF THE INVENTION

An object of the present invention is to provide a driving apparatus for opening and closing a lid which can operate appropriately even if the lid cannot reach a fully opened or closed state when it is hindered by an obstacle.

Another object of the present invention is to provide a driving apparatus for opening and closing a lid in which a user is free from undesired contact during automatic closing of the lid on his finger in the case of a player having a mechanical loading mechanism, and is able to complete in a short time a series of operations until the lid reaches a fully closed state in the case of a player having a power loading mechanism.

According to a first aspect of the present invention, a driving apparatus for opening and closing a lid which is arranged to freely open and close for opening and closing a recording medium insertion opening provided in the front panel of the main body of a recording medium player and on which the lid control buttons are arranged, the apparatus comprises: a motor for driving the lid in an opening direction or a closing direction by a normal rotation or a reverse rotation; detection means for detecting that the lid is in a fully opened position or a fully closed position and for generating a full open detection signal or a full close detection signal; means for generating an abnormal signal if the full open detection signal or the full close detection signal is not generated in a predetermined period of time after the start of the rotation of the motor in a selected direction; and control means for starting the rotation of the motor in the selected direction in response to a command, and for rendering the motor to rotate in an inverse direction if the abnormal signal is generated during the start of rotation, and executing the inversion control operation for inverting the direction of rotation at least one time.

In a driving apparatus for opening and closing a lid according to the first aspect of the present invention, if the lid does not reach a fully opened or a fully closed position in a predetermined period of time after the start of the rotation of the lid driving motor in a selected direction, the motor is rendered to rotate in an inverse direction and the operation to rotate the motor in an inverse direction is executed at least once.

According to a second aspect of the invention, there is provided an apparatus for opening and closing a lid for a recording medium player with a loading mechanism in which a recording medium inserted into a recording medium insertion opening provided in the front panel of the main body of the device is loaded in a playing position utilizing a pushing effort by a user as a source of driving force, the apparatus comprises: a motor for driving the lid in an opening direction or a closing direction by a normal rotation or a reverse rotation; detection means for detecting that a recording medium is inserted into the recording medium insertion opening and generating a detection output signal; and control means for starting the rotation of the motor to drive the lid in the closing direction when a predetermined time period is elapsed after generation of the detection output signal by the detection means.

According to a further aspect of the present invention, there is provided an apparatus for opening and closing a lid for a recording medium player with a loading mechanism in which a recording medium inserted into a recording medium insertion opening is automatically loaded in a playing position in response to a loading command, the apparatus comprises: a motor for driving the lid in an opening direction or a closing direction by a normal rotation or a reverse rotation; command means for generating a lid closing command; and control means for generating the loading command in response to the lid closing command and for controlling the motor to drive the lid in the closing direction.

In the case of the apparatus for opening and closing a lid according to the second aspect of the present invention, when a recording medium is loaded by the mechanical loading mechanism, the drive of the lid in the closing direction is started when a predetermined time period is elapsed after the recording medium is inserted into the recording medium insertion opening.

In the case of the driving apparatus for opening and closing a lid according to the further aspect of the invention, the drive of the lid in the closing direction is started simultaneously with the start of the loading of the recording medium by means a power loading mechanism in response to the lid closing command.

BRIEF DESCRIPTION OF THE DRAWINGS

FIG. 3 is a flowchart showing another processing procedure for the opening and closing drive of a lid.

DETAILED DESCRIPTION OF PREFERRED EMBODIMENTS

An embodiment of the present invention will be explained in detail hereinafter with reference to the accompanying drawings.

Figure 1:
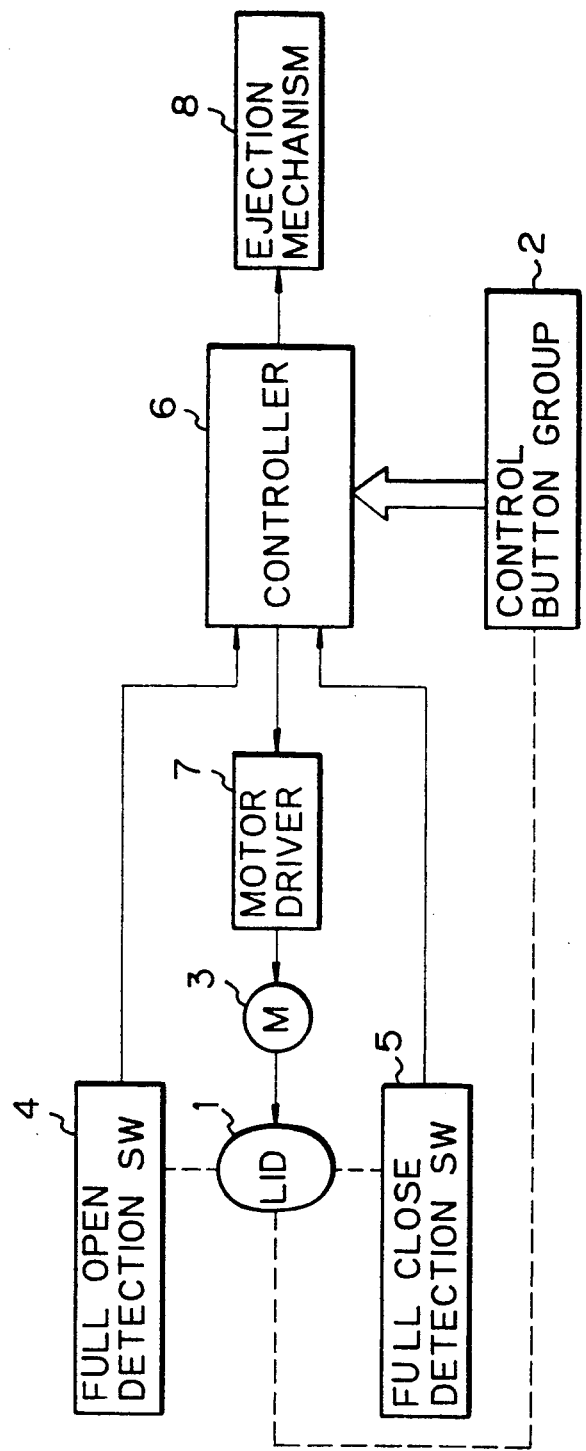
FIG. 1 is a block diagram showing an embodiment of the present invention.

In FIG. 1, a lid 1 is provided, in a manner allowing its opening and closing movements, on a front face of a main body of a cassette deck for example. The lid 1 covers, for example, the whole area of the front face and it opens and closes a cassette insertion opening (not shown in the drawing) located in the front face of the main body of the cassette deck. The lid 1 also serves as a control panel on which a group of control buttons 2, including an ejection button for generating a command of the ejection of a cassette tape, are provided. The control button group 2 also includes a closing button for generating a command for closing the lid 1. However, since the lid closing button is used in a state in which the lid 1 is open, it is disposed on the main body of the deck. A motor 3 is provided as a source of driving force for opening and closing the lid 1. The motor 3 drives the lid 1 in an opening direction or a closing direction, by the rotation in a normal direction or a reverse direction, by way of a reduction gear consisting of a combination of gears (not shown in the drawing). When the lid 1 reaches a fully opened position, a detection switch 4 for detecting a full open state is activated to generate a full open detection signal. When the lid 1 reaches a fully closed position, a detection switch 5 for detecting a full close state is activated to generate a full close detection signal. These detection signals are supplied to a controller 6.

The controller 6 is composed of a microcomputer, and adapted to control the opening and closing drive of the lid 1 and stop of the drive through a motor driving circuit 7 on the basis of various kinds of commands such as the ejecting command generated by the operation of the control button group 2 and also based on the detection signals of detection switches 4 and 5 for the fully opened state or the fully closed state respectively. The controller 6 also controls an ejection mechanism 8 for ejecting a cassette tape loaded in the play position, as occasion demands. The controller 6 manages the state of the operation of the lid 1 in terms of statuses 0 to 9.

Specifically, the status 0 indicates a state in which the lid 1 is fully closed; the status 1 indicates a state where an ejection button 2a is depressed; the status 2 indicates a state where the lid 1 is being driven in the opening direction; the, status 3 indicates a state where the motor 3 is driven during a predetermined period of time after the activation of the full open detection switch 4; the status 4 indicates a fully opened state of the lid 1; the status 5 indicates a waiting state for a predetermined period of time after the start of driving of the lid 1 in the closing direction; the status 6 indicates a state where the lid 1 is being driven in the closing direction; the status 7 indicates a state where the motor 3 is driven during a predetermined period of time after the activation of the full close detection switch 5; the status 8 indicates a state of a time-over error of a timer for timing a predetermined period of time; and the status 9 indicates a fully opened state of the lid 1 after the occurrence of a time-over error.

Figure 2A:
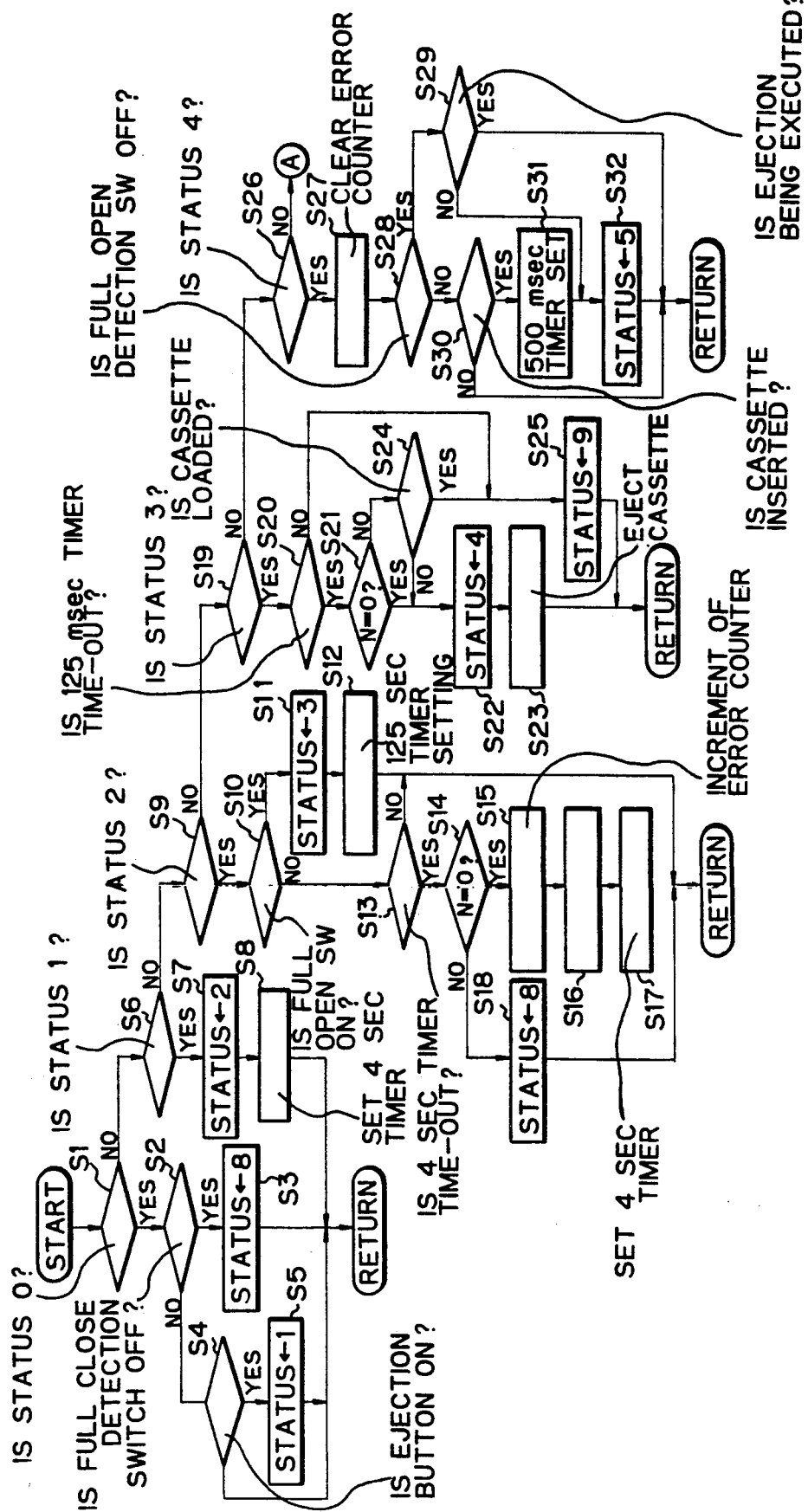
FIGS. 2A and 2B are flowcharts showing a processing procedure of lid opening and closing drive executed by a processor.
Figure 2B:
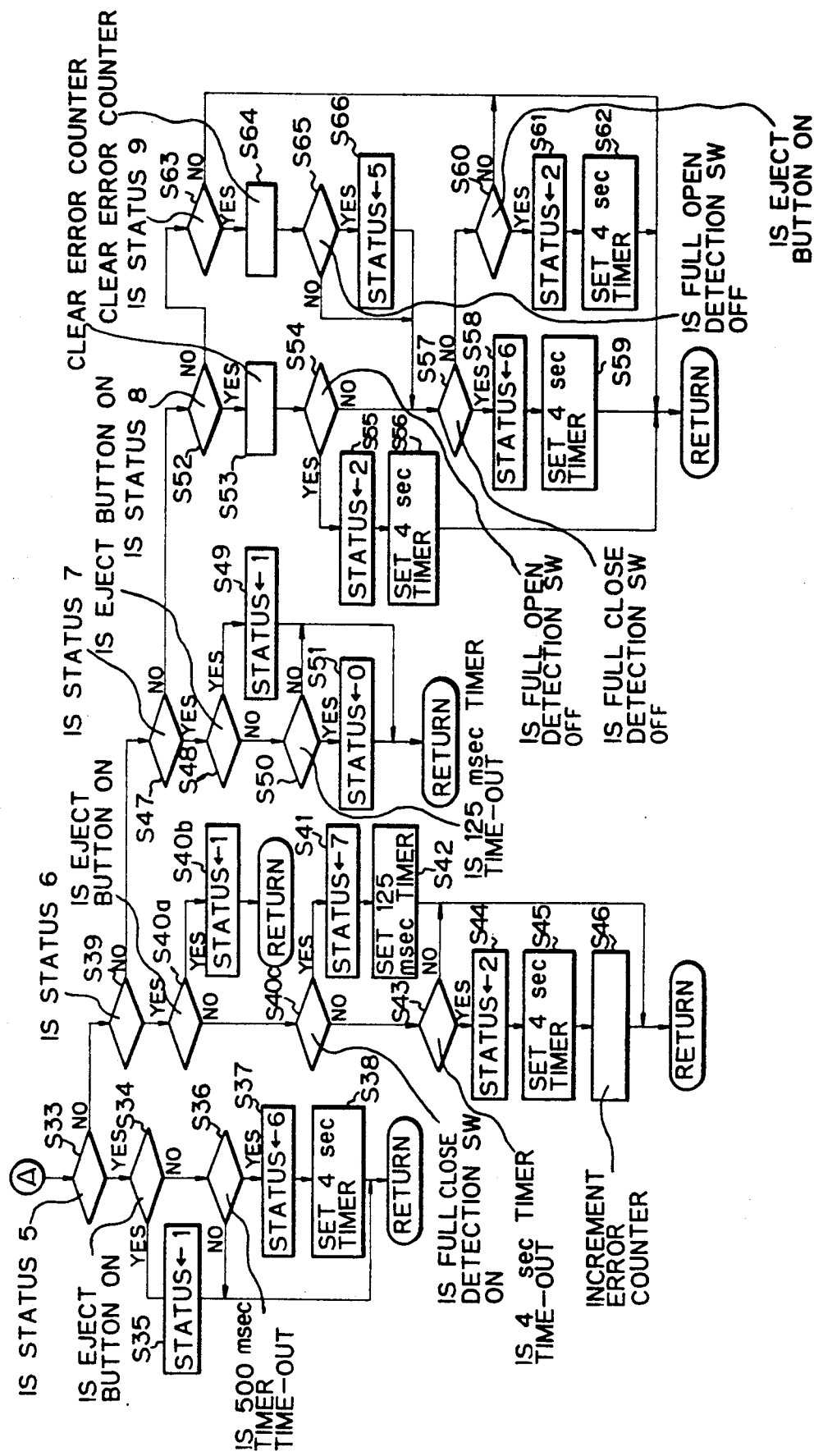

Next, the processing procedure of the opening and closing drive of the lid 1 executed by a processor of the controller 6 will be explained following the flow charts shown in FIG. 2A and FIG. 2B. It is assumed that this subroutine shall be executed when called at predetermined intervals (for example, 7 or 8 milliseconds) during the execution of a main routine.

At first, the processor determines whether or not the status is "0", that is, whether or not the operating state of the deck shows a fully closed state of the lid 1 (step S1). If the status is "0", the processor judges whether or not the full close detection switch 5 is OFF (step S2). If the full close detection switch 5 is OFF, the status is made to "8" (step S3), and the processor returns to the main routine subsequently. If the full close detection switch 5 remains at ON position, the processor judges whether or not the ejection button is depressed (step S4). If the ejection button is depressed, the status is made to "1" (step S5), and the processor returns to the main routine subsequently. If the ejection button is not depressed, the processor directly returns to the main routine. If the status is not "0", the processor judges whether or not the status is "1" (step S6). If the status is "1", the processor sets the status to "2" (step S7), and at the same time it supplies a lid open command for driving the lid 1 in the opening direction to a motor driving circuit 7. Following this operation, the processor sets, for example, a 4 second timer (step S8), and returns to the main routine subsequently.

In step S6, if it is judged that the status is not "1", the processor judges, in the next step, whether or not the status is "2", that is, the processor judges whether or not the lid 1 is being driven in the opening direction (step S9). If the status is "2", the processor judges whether or not the full open detection switch 4 is made ON and a full open detection signal is produced (step S10). If the full open detection switch 4 is ON the processor sets the status to "3" (step S11), and following this operation the processor sets a timer of, for example, 125 milliseconds (step S12). Subsequently, the processor returns to the main routine. If the full close detection switch 5 remains OFF, the processor judges whether or not the 4 second timer which has been set in step S8 has timed out (step S13). If the 4 second timer has not timed out, the processor returns directly to the main routine. If the 4 second timer has time out, the processor judges whether or not the count value N of an error counter provided for counting the number of times of the occurrence of faults is 0 (step S14). If N is 0, the count value of the error counter is incremented by the processor (step S15), and the processor sets the status to "6" (step S16). At the same time, the processor supplies a lid closing command of driving the lid 1 in the closing direction to the motor driving circuit 7, and sets the 4 second timer (step S17). Then the processor returns to the main routine. If N is not 0, the processor sets the status to "8" (step S18), and returns to the main routine subsequently.

In step S9 if it is judged by the processor that the status is not "2", the processor judges, in the next step, whether or not the status is "3", that is, it judges whether or not the motor 3 is being driven for a predetermined period of time (in this example 125 milliseconds) after the full open detection switch 4 is turned ON (step S19). If the status is "3", the processor judges whether or not the 125 milliseconds timer which has been set in step S12 has timed out (step S20). If it has timed out, the processor judges whether or not the count value N of the error counter is 0 (step S21). If N is 0, the processor sets the status to "4" (step S22), and then supplies the ejection command to the ejection mechanism 9 for ejecting the cassette tape (step S23). After that it returns to the main routine. If N is not 0, the processor judges whether or not a cassette tape is loaded in the playing position (step S24). If no cassette tape is loaded, the processor proceeds to step S22. If a cassette tape is loaded, the processor sets the status to "9" (step S25), and then the processor returns to the main routine. In step S20, if it is judged by the processor that the timer has not timed out, the processor returns to the main routine through step S25.

In step S19 if it is judged that the status is not 3, the processor judges whether the status is "4", that is, whether or not the lid 1 is in a fully opened state (step S26). If the status is "4", the processor clears the count value of the error counter (step S27), and judges whether or not the full open detection switch 4 is turned OFF (step S28). If the full open detection switch 4 is OFF, the processor judges whether or not the cassette tape is being ejected (step S29). If the switch 4 remains ON, the processor judges if a cassette tape is inserted (step S30). The detection of insertion of a cassette tape is performed by using an insertion switch (not shown in the drawing) provided at the cassette insertion portion. If a cassette tape is not inserted when the full open detection switch 4 is ON, or if the tape is being ejected when the full open detection switch 4 is OFF, the processor directly returns to the main routine. In step S30, if it is judged by the processor that a cassette tape is inserted, the processor sets a timer for timing 500 milliseconds (step S31). Then the processor sets the status at "5" (step S32) and returns to the main routine. If a tape is not being ejected even if the full open detection switch 4 is OFF, the processor directly proceeds to step S32. The loading mechanism (not shown in the drawing) for a cassette tape in this embodiment is a mechanical loading mechanism in which a cassette tape inserted through the cassette insertion opening is loaded in the playing position utilizing the pushing effort of a user as a source of driving force.

In step S26, if it is judged by the processor that the status is not 4 the processor judges, in the next step, whether or not the status is "5" (step S33). If the status is "5", it judges whether or not ejection button is depressed (step S34). When the ejection button is depressed, the processor sets the status to "1" (step S35), and then it returns to the main routine. On the other hand, when the ejection button is not depressed, the processor judges whether or not the 500 millisecond timer set in step S31 has timed out (step S36). If the timer has timed out, the processor sets the status to "6" (step S37), and at the same time, the processor supplies the lid closing command for driving the lid in the closing direction to the motor driving circuit 7, and further it sets the 4 second timer (step S38) and then returns to the main routine. If the 500 millisecond timer has not timed out, the processor directly returns to the main routine.

In step S33 if it is judged by the processor that the status is not "5", the processor judges, in the next step, whether or not the status is "6", that is, the processor judges whether or not the lid 1 is being driven in the closing direction (step S39). If the status is "6", the processor judges if an ejection button is depressed (step S40a). If the button is depressed, the processor sets the status to "1" (step S40b) and then the processor returns to the main routine. When the ejection button is not depressed, the processor judges whether or not the full close detection switch 5 is turned ON and a full close detection signal is output (step S40c). If the full close detection switch 5 is ON, the processor sets the status to "7" (step S41), and sets a timer for timing 125 milliseconds (step S42). Subsequently the processor returns to the main routine. If the full close detection switch 5 remains OFF, the processor judges whether or not the 4 second timer set in step S38 has timed out (step S43). If the 4 second timer has timed out, the processor sets the status to "2" (step S44). At the same time, the processor supplies the lid opening command for driving the lid 1 in the opening direction to the motor driving circuit 7. Subsequently the processor sets the 4 second timer (step S45). Furthermore, the count value of the error counter is incremented by the processor (step S46), and then the processor returns to the main routine. If the timer has not timed out it directly returns to the main routine.

In step S39 if the processor judges the status is not "6", the processor judges, in the next step, whether or not the status is "7" (step S47). If the status is "7", it judges whether or not the ejection button is depressed (step S48). If the ejection button is depressed, the processor sets the status to "1" (step S49), and then it returns to the main routine. On the other hand, if the ejection button is not depressed, the processor judges whether or not the 125 milliseconds timer set in step S42 has timed out (step S50). If the timer has timed out, the processor sets the status to "0" (step S51) and then returns to the main routine. If the timer has not timed out the processor directly returns to the main routine.

In step S47, if it is judged by the processor that the status is not "7", the processor judges, in the next step, whether or not the status is "8" (step S52). If the status is "8", it clears the count value of the error counter (step S53), and judges whether or not the full open detection switch 4 is OFF (step S54). If the full open detection switch 4 is OFF, the processor sets the status to "2" (step S55), and at the same time it supplies the lid opening command for driving the lid 1 in the opening direction to the motor driving circuit 7. Further the processor sets the 4 second timer (step S56), and then it returns to the main routine. If the full open detection switch 4 remains ON, the processor judges whether or not the full close detection switch 5 is turned OFF (step S57). If the full close detection switch 5 is OFF, the processor sets the status to "6" (step S58), and at the same time, it issues the lid closing command for driving the lid 1 in the closing direction to the motor driving circuit 7 Further it sets the 4 second timer (step S59), and then it returns to the main routine. On other hand, if the full close detection switch 5 remains ON, the processor judges whether or not the ejection button is depressed (step S60). If the ejection button is depressed, the processor sets the status to "2" (step S61), and at the same time, it issues the lid opening command for driving the lid 1 in the opening direction to the motor driving circuit 7. Further it sets a 4 second timer (step S62), and then it returns to the main routine. If the ejection button is not depressed, the processor directly returns to the main routine.

In step S52 if it is judged by the processor that the status is not "8", the processor judges, in the next step, if the status is "9" (step S63). If the status is "9" the processor clears the count value of the error counter (step S64), and then the processor judges whether or not the full open detection switch 4 is turned OFF (step S65). Following this operation, if the full open detection switch 4 is OFF, the processor sets the status to "5" (step S66), and then it proceeds to step S57. If the full open detection switch 4 remains ON the processor directly proceeds to step S57.

According to a series of processing steps as described in the above, when an ejection button is depressed (status 1) in the state in which the lid 1 is fully closed (status 0) and the lid 1 is driven in the opening direction (status 2), the motor is driven in an inverse direction (status 6) before the lid 1 reaches the fully opened state, if a timer of a predetermined period of time (in the present embodiment 4 seconds) times out (step S10 and S13). Even during the operation of driving the lid in the closing direction, if the timer times out before the lid 1 reaches the fully closed position (step S40c and S43), the motor 3 is further operated in the inverse direction (status 2) so that the motor 3 is, for example, controlled to repeat the inversion of the direction of rotation twice. After the twice inversions of rotation, during the lid opening driving, if the timer times out again (step S10 and S13), a time-over error condition (status 8) is established, and at that moment the driving of the motor 3 is stopped.

When the lid 1 is to be driven in the closing direction from the fully opened state of the lid 1 (status 4), the control operation is started from the status 6 through the status 5. Therefore the inversion of the rotation of the motor 3 occurs once, and after the inversion of the rotation, during the motor 3 is driven in the direction to open the lid 1, if the timer times out again, the driving of the motor 3 is stopped.

In the present embodiment, the number of repeating times of the inversion of rotation of the motor 3 is twice when the driving operation is started from the fully closed state of the lid, and the number of times is once when the driving is started from the fully opened state of the lid. However the number of times of repetition can be arbitrarily decided. It is made possible to always stop the driving of the motor 3 in the opening direction of the lid 1 in the event that a fault exists, by setting the number of repeating times to an even number when the driving of the lid is started from the fully closed state, and by setting the number of the repeating times to odd number when the driving of the lid is started from the fully opened state.

When such a fault occurs and the lid 1 cannot reach the fully opened (or closed) state being hindered by an obstacle during the opening (or a closing) operation, the possibility of disentanglement from the fault is increased by repeating the inversion of the rotation of the motor 3. In this way, the possibility that the lid 1 is left in a halfway closed or opened position can be made very small.

In general, when the ejection button is depressed, the lid 1 is driven in the opening direction and when the full open detection switch 4 is turned ON (step S10), the ejection of the cassette tape (step S23) is performed through the status 3. However when a fault occurs during the drive of the lid 1 in the opening direction, and when the full open detection switch 4 is turned ON (step S10) after the inversion of the rotation of the motor 3, the count value N of the error counter is not equal to 0. This means that the status is shifted to the status 9 to stop the motor 3, and the cassette tape will not be ejected.

In the case where a cassette tape is ejected when the lid 1 is fully opened after the inversion of the rotation of the motor 3, the ejected cassette tape may come into contact with an obstacle having caused the fault and again loaded in the player. Furthermore, during the closing operation of the lid 1 the fault can occur once more, and the cassette tape may be ejected again after the repetition of the inversion of the rotation of the motor 3, so that the processing procedure can fall into an endless loop. Therefore, the procedure is prevented from falling into an endless loop by inhibiting the ejection of the cassette tape when the lid 1 is fully opened after the inversion of the rotation of the motor 3.

Furthermore, when the lid 1 is driven in the opening direction (status 2) in response to the ejection command generated by the depression of the ejection button in the state where the lid 1 is fully closed (status 0), when the full open detection switch 4 is turned ON (step S10), the timer of a predetermined period of time (in this embodiment 125 milliseconds) is set (step S12), and after the time out of the timer (step S20), the status is shifted to the status 4 so that the drive of the motor 3 is stopped. When the lid 1 is driven in the closing direction (status 6) through status 5 by the insertion of a cassette tape or by the manual pushing-up of the lid 1 in the state where the lid 1 is fully opened (status 4), and the full close detection switch 5 is turned ON (step S40c), the timer of 125 milliseconds is set (step S42), and after the time out of the timer (step S50), the status is shifted to the status 0 so that the drive of the motor 3 is topped.

Thus when it is detected that the lid 1 has reached the fully opened (or closed) position, the motor 3 is driven for the predetermined period of time and subsequently the motor is stopped. In this way, the lid 1 can be surely fixed in a fully opened (or closed) position.

As described in the above, according to the first aspect of the present invention, the apparatus is arranged such that, in a driving apparatus for opening and closing the lid, if the lid does not reach a fully opened or a fully closed position in a predetermined period of time after the starting of a lid driving motor in the selected direction, the rotation of the motor is inverted, and the inversion of the rotation is executed at least one time. Therefore, in the case of occurrence of such a fault that the lid cannot reach a fully opened or a fully closed state when the lid is hindered by an obstacle, the probability of extrication from such a fault state is raised by the inversion of the rotation of the motor, and the possibility that the lid is left in a halfway position is made very small.

According to the second aspect of the present invention, in a fully opened state of the lid 1 (status 4) of the series of process procedures, when a cassette tape is inserted into the cassette insertion opening, at first a timer of a predetermined period of time is set (in the embodiment 500 milliseconds) (step S30). After the time out of the timer (step S36), the status is shifted to the status 6, and the drive of the motor 3 is started to drive the lid 1 in the closing direction.

As described above, in the case of the loading of a cassette tape by means of a mechanical loading device, since the closing drive of the lid 1 is started when a predetermined period of time has elapsed from the point of time when the cassette tape is inserted into a cassette insertion opening, a finger of the user by which a cassette tape is inserted does not come in contact with the lid 1. Thus the user is prevented from the lid 1 pinching a finger. Particularly, the arrangement is advantageous in loading mechanisms in which it is necessary to push the cassette tape deeply into the mechanism.

Next, the explanation will be made, following the flow chart shown in FIG. 3, on the processing procedure of opening and closing drive of the lid 1 in a cassette deck provided with a power loading mechanism in which a cassette tape is automatically loaded into the playing position in response to a loading command, and the like. With respect to this embodiment, only parts corresponding to step S30 to S32 shown in FIG. 2A differ from the above described embodiment, and only the different parts are shown in FIG. 3.

After the execution of the operation of step S28, the processor judges whether or not a closing button, which gives a lid closing command for closing the lid 1 is turned ON (step S101). If the closing button is not ON, the processor issues a loading command (step S102) to a power loading mechanism (not shown in the drawing) when a cassette tape is inserted. In the similar manner as the above described embodiment, the processor sets a 500 millisecond timer for timing 500 millisecond (step S31), further it sets the status to "5" (step S32). Subsequently the processor returns to the main routine. On the other hand, if the closing button is ON, the processor immediately issues the loading command to the power loading mechanism (step S103), and it sets the status to "6" (step S104). Furthermore the processor sets the 4 second timer (step S105), and then it returns to the main routine.

In the processing procedure described above, the loading operation of the power loading mechanism is started in response to the closing command for the lid 1 by the close button, and simultaneously the status is shifted to the status 6, so that the drive of the motor 3 is started to drive the lid 1 in the closing direction. Therefore, a series of operations from the lid closing command for closing the lid 1 by the closing button until the time when the lid 1 reaches the fully closed position can be completed in a short time.

As described in the above, in the case of the apparatus for opening and closing the lid according to the present invention, when the cassette tape is loaded by a mechanical loading device, the lid closing drive is started after the lapse of a predetermined period of time from the point of time when the recording medium is inserted into the recording medium insertion opening. Therefore the user is prevented from having the lid come in contact with a finger after the insertion of the recording medium. Particularly this feature is advantageous in the case of loading mechanisms in which the recording medium must be inserted deeply into the mechanism.

On the other hand, in the case of cassette decks provided with a power loading mechanism, the loading of the cassette tape is started in response to a lid closing command for closing the lid, and at the same time the closing drive of the lid is started. Thus a series of operations from the generation of the lid closing command until the lid reaches a fully closed position can be completed quickly.

What is claimed is:

1. A driving apparatus for opening and closing a lid of a recording medium player, said led being responsive to a command to freely open and close a recording medium insertion opening provided in the front panel of a main body of the recording medium player, the apparatus comprising:

a motor for driving said lid in a selected one of an opening direction and a closing direction by a a selected one of a first and second direction of rotation, respectively;

detection means for detecting that said lid has reached a fully opened position and a fully closed position and for generating a full open detection signal and a full close detection signal, respectively;

means for generating an abnormal signal if said full open detection signal or said full close detection signal is not generated within a first predetermined period of time after the start of rotation of said motor in a selected direction of rotation;

means for starting said motor in the selected direction of rotation in response to the command;

means, responsive to the abnormal signal, for rendering said motor to rotate in a direction opposite said selected direction of rotation if said abnormal signal is generated during the rotation of said motor in said selected direction, and for executing rotation of said motor in the direction opposite said selected direction of rotation; and means for controlling said motor to continue to rotate in either said selected direction of rotation or the direction opposite said selected direction for a second predetermined time after either said full open detection signal or said full close detection signal is generated, thereby ensuring that said lid is fixed in either a full opened or closed position.

2. A driving apparatus as claimed in claim 1 wherein said controlling means controls said motor to stop after the lapse of said first predetermined period of time when said abnormal signal is generated during the drive of said lid in the opening direction after said motor had driven said lid in the selected closing direction.

3. A driving apparatus as claimed in claim 1, wherein said lid comprises a plurality of control buttons arranged thereon.

4. A driving apparatus as claimed in claim 1 wherein said driving apparatus further comprises:
   command means for issuing an ejection command for ejecting the recording medium;
   ejection means for ejecting said recording medium to said recording medium insertion opening from the playing position in response to said full open detection signal issued in an operation for opening said lid started by said ejection command; and
   inhibition means for inhibiting the ejection operation by said ejection means upon generation of said full open detection signal during the operation for opening said lid after a change in rotation direction operation.

5. A driving apparatus for opening and closing a lid in a recording medium player having a loading mechanism for loading a recording medium in a playing position, wherein a user pushes the recording medium into a recording medium insertion opening provided in a front panel of a main body of the player, the lid being arranged to freely open and close for opening and closing said recording medium insertion opening, the apparatus comprising:
   a motor for driving said lid in an opening direction and a closing direction;
   detection means for generating a detection output signal upon detecting that a recording medium is inserted into said recording medium insertion opening; and
   control means for controlling said motor to drive said lid in a closing direction after a predetermined period of time has elapsed after the generation of said detection output signal.

6. A driving apparatus for opening and closing a lid of a recording medium player, said lid being responsive to a command to freely open and close a recording medium insertion opening provided in the recording medium player, the apparatus comprising:
   a motor for driving said lid in a selected one of an opening direction and a closing direction;
   detection means for detecting that said lid has reached a fully opened position and a fully closed position and for generating a full open detection signal and a full close detection signal, respectively;
   means for generating an abnormal signal if said full open detection signal or said full close detection signal is not generated within a predetermined period of time after said lid is driven in a selected direction;
   means for driving said lid in the selected direction in response to the command; and
   means, responsive to said abnormal signal, for changing the direction of said lid, wherein said changing means further drives said lid in the selected direction in response to an abnormal signal being generated again after said changing means had changed the direction of said lid from the selected direction to the direction opposite said selected direction.

7. The driving apparatus of claim 6, further comprising means for controlling said motor to continue to rotate in either said selected direction of rotation or the direction opposite said selected direction for a set time after either said full open detection signal or said full close detection signal is generated, thereby ensuring that said lid is fixed in either a full opened or closed position.

8. The driving apparatus of claim 7, further comprising means for delaying automatic closing of said lid in response to insertion of a recording medium in the insertion opening of said recording medium player.

9. The driving apparatus of claim 7, further comprising means for simultaneously loading a recording medium inserted in the insertion opening of said recording medium player and closing said lid.

10. The driving apparatus of claim 7, further comprising means for inhibiting an ejection operation of a recording medium loaded in said recording medium player upon generation of said full open detection signal during the operation for opening said lid after a change in direction of said lid.

* * * * *